US010882581B2

(12) United States Patent
Matsumoto et al.

(10) Patent No.: US 10,882,581 B2
(45) Date of Patent: Jan. 5, 2021

(54) OPERATING DEVICE AND OPERATING SYSTEM

(71) Applicant: Shimano Inc., Osaka (JP)

(72) Inventors: Hiroshi Matsumoto, Osaka (JP); Takuma Sakai, Osaka (JP); Kazuma Mori, Osaka (JP); Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/354,754

(22) Filed: Mar. 15, 2019

(65) Prior Publication Data

US 2019/0300100 A1 Oct. 3, 2019

(30) Foreign Application Priority Data

Mar. 30, 2018 (JP) ................. 2018-068293

(51) Int. Cl.
| | | |
|---|---|---|
| *B62K 23/02* | (2006.01) | |
| *B62L 3/02* | (2006.01) | |
| *B62M 25/04* | (2006.01) | |
| *B62K 23/06* | (2006.01) | |
| *B62L 1/14* | (2006.01) | |
| *B62M 25/08* | (2006.01) | |

(52) U.S. Cl.
CPC ............... *B62K 23/06* (2013.01); *B62L 1/14* (2013.01); *B62L 3/02* (2013.01); *B62L 3/023* (2013.01); *B62M 25/04* (2013.01); *B62M 25/08* (2013.01)

(58) Field of Classification Search
CPC ... B62L 1/14; B62L 3/02; B62L 3/023; B62K 23/02; B62K 23/06; B62M 25/04; B62M 25/08
See application file for complete search history.

(56) References Cited

U.S. PATENT DOCUMENTS

| 4,232,565 | A | * | 11/1980 | Leonheart | .............. | B62K 23/04 74/104 |
|---|---|---|---|---|---|---|
| 4,901,595 | A | * | 2/1990 | Ozaki | ........................ | B62L 3/02 188/2 D |
| 4,930,798 | A | * | 6/1990 | Yamazaki | ............ | B62K 21/125 280/261 |
| 5,941,125 | A | * | 8/1999 | Watarai | ................. | B62K 23/06 74/473.14 |
| 6,694,840 | B2 | * | 2/2004 | Kawakami | ............ | B62K 23/06 74/489 |

(Continued)

FOREIGN PATENT DOCUMENTS

| CN | 202147805 U | 2/2012 |
|---|---|---|
| JP | 1-132488 A | 5/1989 |

*Primary Examiner* — Adam D Rogers
(74) *Attorney, Agent, or Firm* — Global IP Counselors, LLP

(57) ABSTRACT

An operating device includes a base member, an operating member, a first connecting part, a second connecting part and an additional component. The base member is mounted on a human-powered vehicle; an operating member provided to the base member. The first connecting part is provided to one of the base member and the operating member in a manner connectable to a power transmitting medium. The second connecting part is provided to the base member in a manner connectable to the power transmitting medium. The additional component is provided to at least one of the base member and the operating member.

12 Claims, 7 Drawing Sheets

(56) References Cited

U.S. PATENT DOCUMENTS

| | | | | |
|---|---|---|---|---|
| 6,725,978 | B2* | 4/2004 | Karpowich | B60T 11/046 |
| | | | | 188/106 P |
| 7,938,234 | B2* | 5/2011 | Jinbo | B60T 11/046 |
| | | | | 188/2 D |
| 8,935,969 | B2* | 1/2015 | Hirukawa | B60T 7/104 |
| | | | | 188/24.18 |
| 9,994,282 | B2* | 6/2018 | Kariyama | B60T 7/102 |
| 10,086,708 | B2* | 10/2018 | Ichida | B60L 58/13 |
| 10,183,724 | B2* | 1/2019 | Hara | B62M 25/04 |
| 10,442,495 | B2* | 10/2019 | Kariyama | B60T 17/04 |
| 2006/0185940 | A1* | 8/2006 | Tsai | B62L 3/02 |
| | | | | 188/24.12 |
| 2012/0200061 | A1* | 8/2012 | D'Aluisio | B62K 23/06 |
| | | | | 280/281.1 |
| 2012/0247253 | A1* | 10/2012 | Chang | B62K 23/04 |
| | | | | 74/473.3 |
| 2014/0360303 | A1* | 12/2014 | Meggiolan | B62M 25/08 |
| | | | | 74/488 |
| 2016/0257370 | A1* | 9/2016 | Hashimoto | B62M 25/08 |
| 2018/0086413 | A1* | 3/2018 | Komatsu | B62K 23/06 |
| 2019/0389533 | A1* | 12/2019 | Kariyama | B60T 7/102 |

* cited by examiner

OPERATING DEVICE AND OPERATING SYSTEM

CROSS-REFERENCE TO RELATED APPLICATIONS

This application claims priority to Japanese Patent Application No. 2018-068293, filed on Mar. 30, 2018. The entire disclosure of Japanese Patent Application No. 2018-068293 is hereby incorporated herein by reference.

BACKGROUND

Technical Field

The present invention generally relates to an operating device and an operating system.

Background Information

An operating device that is manually operable by a user is provided to human-powered vehicles, such as bicycles. Japanese Patent Application Laid-Open No. H1-132488 (Patent Literature 1) discloses a technique for providing an operating device for a brake at a plurality of locations.

SUMMARY

It is possible to provide a human-powered vehicle with some additional components that are manually operable by a user, without limitation to the operating device for a brake. However, with the brake operating device disclosed in Patent Literature 1, it has been difficult for a user to operate the additional component while accessing the operating device.

The present invention has been made to solve the problem described above, and an object of the present invention is to provide an operating device and an operating system capable of allowing a user to operate the additional component more easily.

To solve the above-described problem and achieve the object, according to a first aspect of the present invention, an operating device includes a base member mounted on a human-powered vehicle; an operating member provided to the base member; a first connecting part provided to one of the base member and the operating member in a manner connectable to a power transmitting medium; a second connecting part provided to the base member in a manner connectable to the power transmitting medium; and an additional component provided to at least one of the base member and the operating member.

According to the operating device of the first aspect, the additional component is provided to at least one of the base member and the operating member, and thus a user operating the operating member can operate the additional component easily. Furthermore, the operating device includes the first connecting part and the second connecting part, thereby making it possible to connect plural structures capable of sharing a power transmission system with the operating device via the power transmitting medium.

According to a second aspect, in the operating device according to the first aspect, the operating member is pivotally provided to the base member.

According to the operating device of the second aspect, the operating device can be operated by pivoting the operating device with respect to the base member. Therefore, it is possible to allow a user to operate the additional component more easily. Furthermore, the operating device is easy to operate, and thus the operating device can be easily operated simultaneously with the additional component.

According to a third aspect, in the operating device according to the first or second aspect, the additional component is removably provided to at least one of the base member and the operating member.

According to the operating device of the third aspect, the work including removal of the additional component can be easily performed.

According to a fourth aspect, in the operating device according to any one of the first to third aspects, the additional component is provided to the base member.

According to the operating device of the fourth aspect, the additional component can be fixed and positioned more reliably.

According to a fifth aspect, in the operating device according to any one of the first to fourth aspects, the base member is configured to be fixed to a handlebar of the human-powered vehicle, and the additional component is provided to the base member at a position accessible by a user holding a grip portion of the handlebar.

According to the operating device of the fifth aspect, a user holding the handlebar can easily access both the operating member provided to the base member, and the additional component simultaneously.

According to a sixth aspect, in the operating device according to any one of the first to fifth aspects, the additional component is provided at a position accessible by a user touching the operating member.

According to the operating device of the sixth aspect, a user can easily access both the operating member and the additional component simultaneously.

According to a seventh aspect, in the operating device according to any one of the first to sixth aspects, the additional component is one of a transmission operating device, a driving unit mode selector, a suspension operating device, an adjustable seatpost operating device, and a system information display.

According to the operating device of the seventh aspect, it is possible to allow a user to more easily operate a transmission operating device for a transmission, a driving unit mode selector for a driving unit, a suspension operating device for suspensions, an adjustable seatpost operating device for an adjustable seatpost, or a system information display.

According to an eighth aspect, the operating device according to any one of the first to seventh aspects further includes another operating device connected to the second connecting part via the power transmitting medium.

According to the operating device of the eighth aspect, a user can operate any one of the operating devices.

According to a ninth aspect, in the operating device according to any one of the first to eighth aspects, the base member includes a cylinder bore, and a piston that is provided in the cylinder bore in a manner movable in response to an input to the operating member; the power transmitting medium is hydraulic fluid; the first connecting part is configured to be connected to a first hose for circulating the hydraulic fluid; and the second connecting part is configured to be connected to a second hose for circulating the hydraulic fluid.

According to the operating device of the ninth aspect, it is possible to allow a user to more easily operate the additional component of the operating device having an operation system that uses hydraulic fluid as the power transmitting medium.

According to a tenth aspect, in the operating device according to any one of the first to eighth aspects, the power transmitting medium is a Bowden cable including an outer casing and an inner wire; the outer casing includes a first outer casing and a second outer casing; the first connecting part is configured to be connected to the first outer casing; and the second connecting part is configured to be connected to the second outer casing.

According to the operating device of the tenth aspect, it is possible to allow a user to more easily operate the additional component of the operating device having an operation system that uses a Bowden cable as the power transmitting medium.

To solve the above-described problem and to achieve the object, according to an eleventh aspect, an operating system includes the operating device according to any one of the first to tenth aspects; and further includes an operated device connected to the operating device via the power transmitting medium.

According to the operating system of the eleventh aspect, it is possible to allow a user to more easily operate the additional component and to allow the user to more easily operate the operated device via the operating device.

According to the present invention, a user can operate an additional component more easily.

BRIEF DESCRIPTION OF DRAWINGS

Referring now to the attached drawings which form a part of this original disclosure.

DETAILED DESCRIPTION OF EMBODIMENTS

Preferred embodiments of the present invention will be described in detail below with reference to the accompanying drawings. These embodiments are, however, not intended to limit the scope of the present invention any way, and when plural embodiments are available, any combination of the embodiments also fall within the scope of the present invention.

First Embodiment

Figure 1:
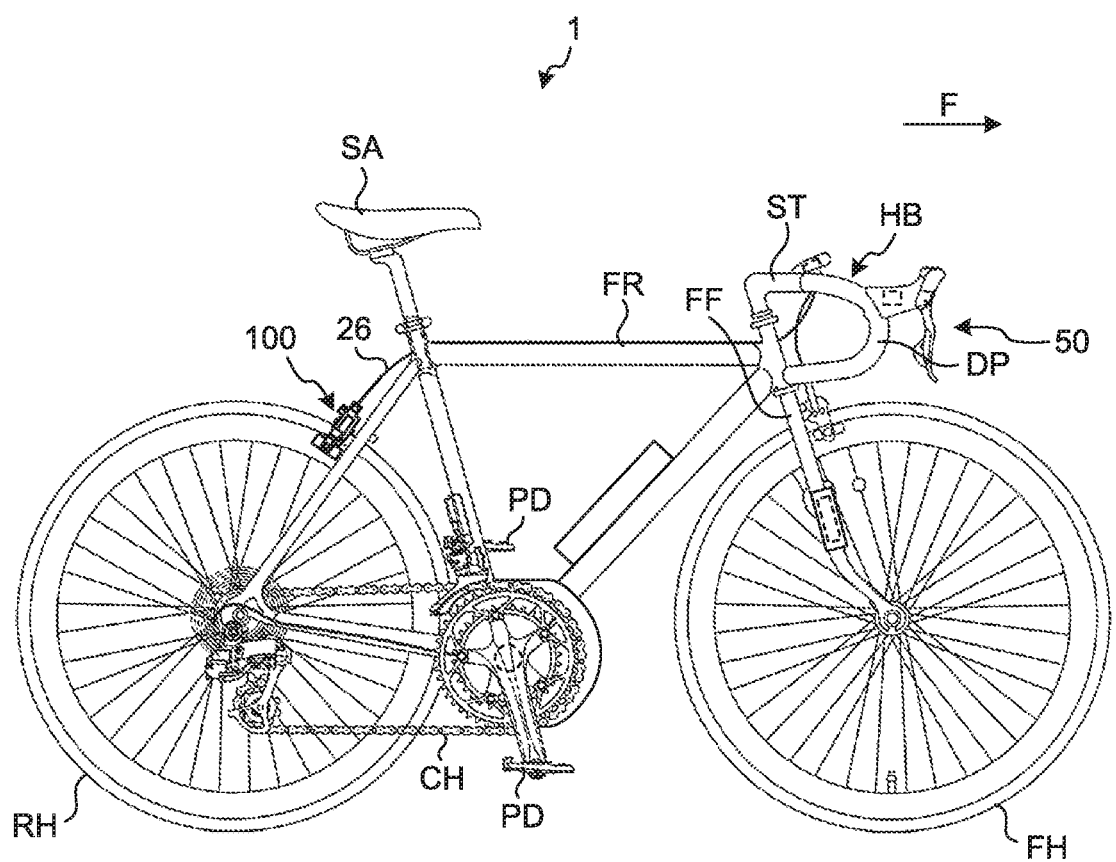
FIG. 1 is a schematic illustrating a structure of a human-powered vehicle on which an operating system including an operating device according to a first embodiment is to be mounted.

A human-powered vehicle 1 illustrated in FIG. 1 includes a front wheel FH that is rotatably supported by a front fork FF, and a rear wheel RH that is rotatably supported by a frame FR. The rear wheel RH is caused to rotate by a rotative force of a pair of pedals PD transmitted via a chain CH. The pedals PD are operated by a user riding the human-powered vehicle 1 to sit on the saddle SA. A stem ST is fixed to the steering column of the front fork FF. The front fork FF and the stem ST are provided pivotably with respect to the frame FR. The rotational axis of the front wheel FH and the pivotable axis of the front fork FF have a positional relation intersecting each other or skewed with respect each other. The rotational axis of the front wheel FH pivots with respect to the rotational axis of the rear wheel RH in accordance with the rotation of the steering column of the front fork FF, so that the human-powered vehicle 1 is steered. In FIG. 1, and FIGS. 2, 4 to 7, which will be described later, the direction in which the human-powered vehicle 1 advances is indicated with the arrow F.

Figure 2:
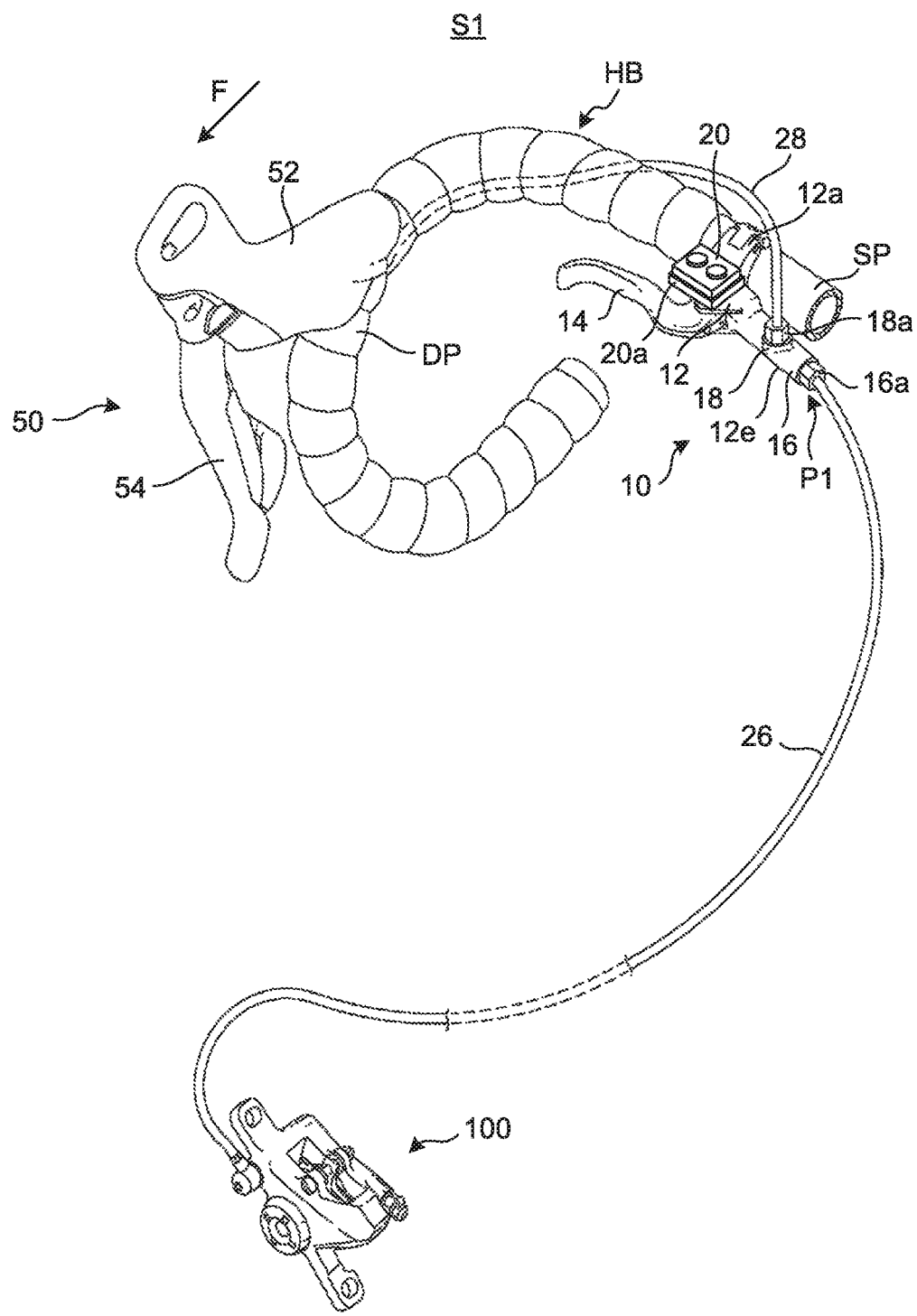
FIG. 2 is a perspective view illustrating the operating system including the operating device according to the first embodiment.

As illustrated in FIG. 2, the stem ST is provided with a handlebar HB to which the steering force of the user is transmitted. The handlebar HB includes a straight portion SP extending toward both sides in the rotational axial direction of the front wheel FH, with the stem ST positioned therebetween; and drop-down portions DP extending from both ends of the straight portion SP in a manner curving downwards and rearwards. The terms "front", "rear", "left", "right", "up", and "down", and terms similar thereto indicate "front", "rear", "left", "right", "up", and "down" as viewed from a user sitting on the saddle SA and facing the handlebar HB.

As illustrated in FIG. 2, the human-powered vehicle 1 is provided with an operating system S1. The operating system S1 includes an operating device 10, and an operated device 100 connected to the operating device 10 via a power transmitting medium. The operating device 10 includes a base member 12 mounted on the human-powered vehicle 1, an operating member 14 provided to the base member 12, a first connecting part 16 provided to the base member 12 in a manner connectable to the power transmitting medium, a second connecting part 18 provided to the base member 12 in a manner connectable to the power transmitting medium, and an additional component 20 provided on at least one of the base member 12 and the operating member 14. In the first embodiment, the operating device 10 is a sub-brake for a main brake 50 which will be described later.

The base member 12 is configured to be fixed to the handlebar HB of the human-powered vehicle 1. The base member 12 includes a clamp 12a for clamping the handlebar HB. A part of the clamp 12a is provided integrally with the base member 12. In the first embodiment, the base member 12 is fixed to the straight portion SP of the handlebar HB.

Figure 3:
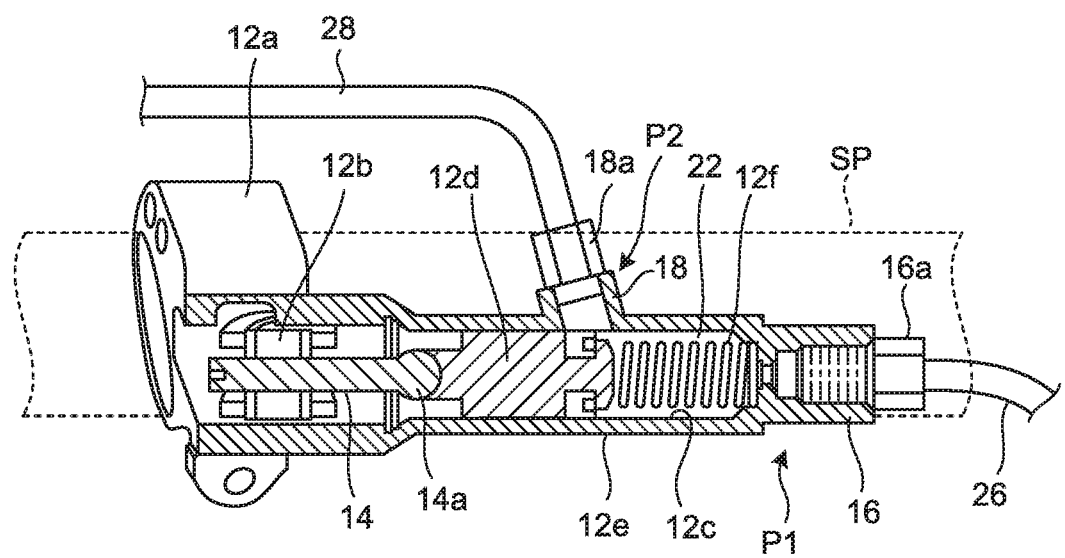
FIG. 3 is a sectional view of an internal structure including a cylinder bore and a piston provided to the operating device.

As illustrated in FIG. 3, the operating member 14 is pivotally provided to the base member 12. The operating member 14 is pivotally provided about a pivot shaft 12b as the axis. The pivot shaft 12b is supported by the base member 12.

As illustrated in FIG. 3, the base member 12 includes a cylinder bore 12c, and a piston 12d that is provided in the cylinder bore 12c in a manner movable in response to an input to the operating member 14. The piston 12d is provided movably inside of the cylinder bore 12c along the axial direction of the cylinder bore 12c. The cylinder bore 12c and the piston 12d make up a master cylinder 12e. A spring 12f is also provided inside the cylinder bore 12c. The piston 12d is interposed between the spring 12f and a pressing portion 14a of the operating member 14. The space inside of the cylinder bore 12c is filled with hydraulic fluid 22. When the operating member 14 pivots in response to an operation of a user, the pressing portion 14a presses the piston 12d toward the side of the spring 12f. The piston 12d is caused to move toward the spring 12f by being pressed by the pressing portion 14a, and to push out the hydraulic fluid 22 from the cylinder bore 12c.

The first connecting part 16 illustrated in FIGS. 2 and 3 serves as a transfer port for the hydraulic fluid 22, provided in the cylinder bore 12c. The first connecting part 16 is provided at a first position P1. The first position P1 is located at the position of an end of the master cylinder 12e where the spring 12f is placed inside of the cylinder bore 12c. A first hose 26 is connected to the first connecting part 16 for circulating the hydraulic fluid 22. The first hose 26 is connected to the first connecting part 16 with a nut 16a for fixing one end of the first hose 26 to the tip of the first connecting part 16. The other end of the first hose 26 is connected to the operated device 100. The first hose 26 serves as a flow channel for the hydraulic fluid 22, in which the hydraulic fluid 22 flows and which is continuous to the cylinder bore 12c.

The hydraulic fluid 22 is pushed out from the cylinder bore 12c by the piston 12d. In this way, the hydraulic fluid 22 is transferred into the operated device 100 via the first connecting part 16 and the first hose 26, and operates the operated device 100. The operated device 100 is connected to the first connecting part 16 via the power transmitting medium. In other words, in the structure explained with reference to FIGS. 2 and 3, the power transmitting medium is the hydraulic fluid 22.

As illustrated in FIGS. 2 and 3, the second connecting part 18 serves as a branched transfer port for the hydraulic fluid 22 that is the power transmitting medium, which is provided in the cylinder bore 12c. The second connecting part 18 is provided at a second position P2. The second position P2 is located at a position on a side of the master cylinder 12e. Thus, the second position P2 is above the ground contact surface of the front wheel FH when the user rides the human-powered vehicle 1. A second hose 28 is connected to the second connecting part 18 for circulating the hydraulic fluid 22. The second hose 28 is connected to the second connecting part 18 with a nut 18a for fixing one end of the second hose 28 to the tip of the second connecting part 18. The other end of the second hose 28 is connected to the main brake 50 that is another operating device. In other words, the other operating device is connected to the second connecting part 18 via the power transmitting medium. In contrast to this, the operating device 10 illustrated in, for example, FIG. 2 is a sub-brake.

As illustrated in FIG. 2, the main brake 50 includes a base member 52 that is mounted on the human-powered vehicle 1, and an operating member 54 that is provided to the base member 52. The base member 52 has a structure having a master cylinder, in the same manner as the base member 12. The base member 52 is fixed to the drop-down portion DP of the handlebar HB. The operating member 54 is pivotally provided to the base member 52, the same as the operating member 14 that is pivotally provided to the base member 12. When the operating member 54 pivots, the cylinder in the base member 52 is caused to move to push the hydraulic fluid 22 out from the base member 52, in the same manner as the operating member 14. The hydraulic fluid 22 is pushed out from the base member 52. In this way, the hydraulic fluid 22 is transferred into the cylinder bore 12c via the second connecting part 18. In this manner, the hydraulic pressure inside of the cylinder bore 12c is increased, and the hydraulic fluid 22 is pushed out from the cylinder bore 12c toward the first connecting part 16. The hydraulic fluid 22 is then transferred into the operated device 100 via the first connecting part 16 and the first hose 26, and operates the operated device 100.

Figure 4:
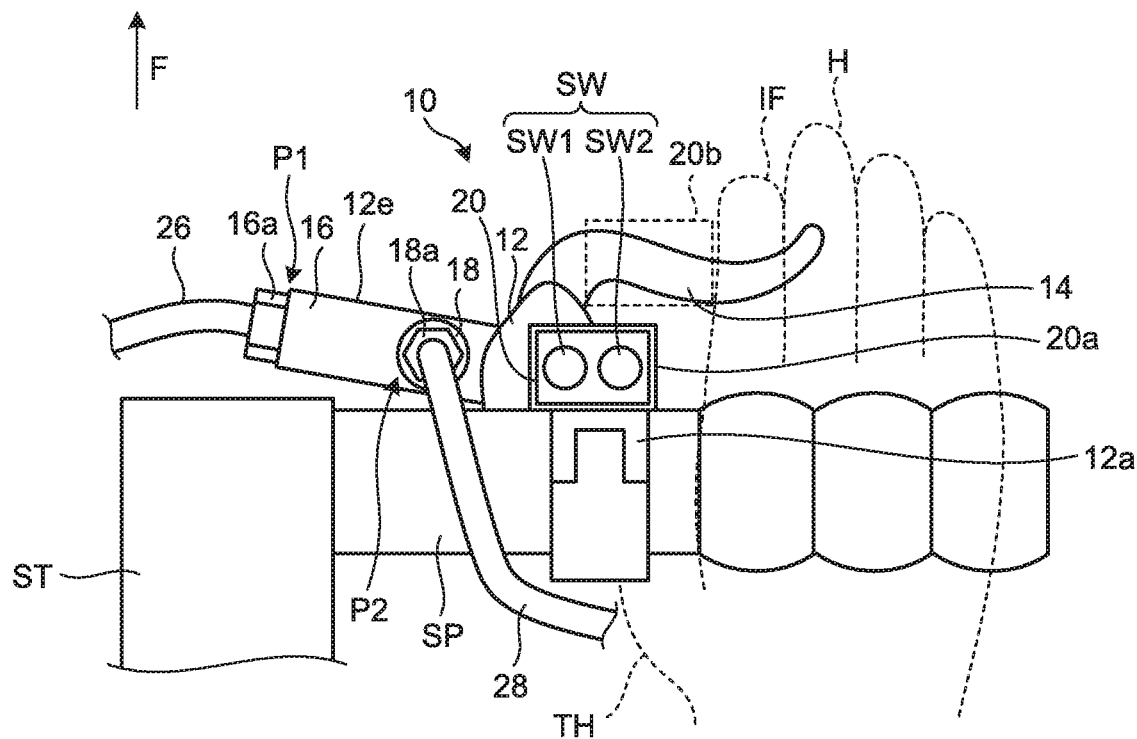
FIG. 4 is a schematic illustrating a positional relation of an operating member and a hand H of a user.

The additional component 20 is removably provided on at least one of the base member 12 and the operating member 14. Specifically, as illustrated in FIGS. 2 and 4, the additional component 20 is removably provided to a removable portion 20a that is provided to the base member 12. The removable portion 20a is a resin frame body that is fixed to the base member 12, and holds the additional component 20 with the elasticity of the frame body. The removable portion 20a is provided to the base member 12 in a manner facing upwards, with respect to the ground contact surface of the front wheel FH when the user rides the human-powered vehicle 1. In other words, the additional component 20 is mounted on the base member 12 in a manner facing upwards. Furthermore, the additional component 20 is provided to the base member 12, as illustrated in FIGS. 2 and 4.

The additional component 20 illustrated in FIG. 4 is an electronic device having a plurality of switches SW. The switches SW includes a first switch SW1 and a second switch SW2. In this manner, the additional component 20 can be configured to operate the electronic device provided to the human-powered vehicle 1 using the switch SW. Furthermore, the additional component 20 can be a transmission operating device for one of a transmission, a driving unit mode selector for a driving unit, a suspension operating device for suspensions, an adjustable seatpost operating device for an adjustable seatpost, and a system information display. The transmission can be an external transmission such as a derailleur, or an internal transmission mounted on the hub of the rear wheel RH or provided to a driving unit mounted on the frame FR. The driving unit is used in an electric assisted bicycle (e-bike), and is configured to assist human driving power using a motor. The driving unit mode selector is an electronic device capable of changing the settings of the driving unit, e.g., a degree of assisting power of the motor. The suspension operating device is an electronic device controlling the operations of the suspensions provided to the front fork FF. The adjustable seatpost operating device is a device for moving the adjustable seatpost that adjusts the position of the saddle SA. The system information display is an electronic device capable of displaying information related to travelling of the human-powered vehicle 1.

The position of the additional component 20 is not limited to the base member 12. The removable portion 20a can be provided to the operating member 14. An alternative position 20b is shown by a dotted line in FIG. 4, as an example in which the removable portion 20a is provided to the operating member 14.

The additional component 20 is preferably provided to the base member 12 at a position accessible by a user holding the handlebar HB. The additional component 20 is also preferably provided at a position accessible by a user touching the operating member 14. FIG. 4 illustrates a state in which a user holds the handlebar HB at the position where the user can hook his/her hand H over the operating member 14 of the operating device 10 mounted on the handlebar HB. In this example, the additional component 20 is provided at a position where the user can operate the additional component 20 merely by slightly moving his/her hand H toward the stem ST, e.g., stretching his/her index finger IF toward the additional component 20. In FIG. 4, as described earlier, the additional component 20 is mounted on the base member 12 in a manner facing upwards with respect to the ground contact surface of the front wheel FH, but the configuration is not limited thereto. Alternatively, the additional component 20 can be provided to the base member 12 on the side facing the ground contact surface, assuming that the operation is done using a thumb TH that is on the side of the ground contact surface with respect to the handlebar HB. In such a configuration, the additional component 20 is preferably provided at a position accessible with the thumb TH, e.g., the side of the clamp 12a facing the ground contact surface.

First Modification

The arrangement of the first connecting part 16 and the second connecting part 18 is not limited to the arrangement in which the first connecting part 16 and the second connecting part 18 are arranged integrally with the master cylinder 12e, as explained with reference to FIGS. 2 and 3. In an operating device 10a of an operating system S2 illustrated in FIG. 5, the first connecting part 16 and the second connecting part 18 are not arranged on a master cylinder 12g that is included in the base member 12, unlike the operating device 10 explained with reference to FIGS. 2 to 4. One end of a hose 12h is attached to the master cylinder 12g for allowing the hydraulic fluid 22 to be movably provided from the master cylinder 12g to the hose 12h. The end of the hose 12h is connected to the master cylinder 12g at a position corresponding to the position on the master cylinder 12e where the first connecting part 16 is provided in FIG. 2. A specific configuration of the master cylinder 12g is the same as the master cylinder 12e except that the master cylinder 12g does not have the first connecting part 16 and the second connecting part 18, and the hose 12h is connected to the master cylinder 12g.

Figure 5:
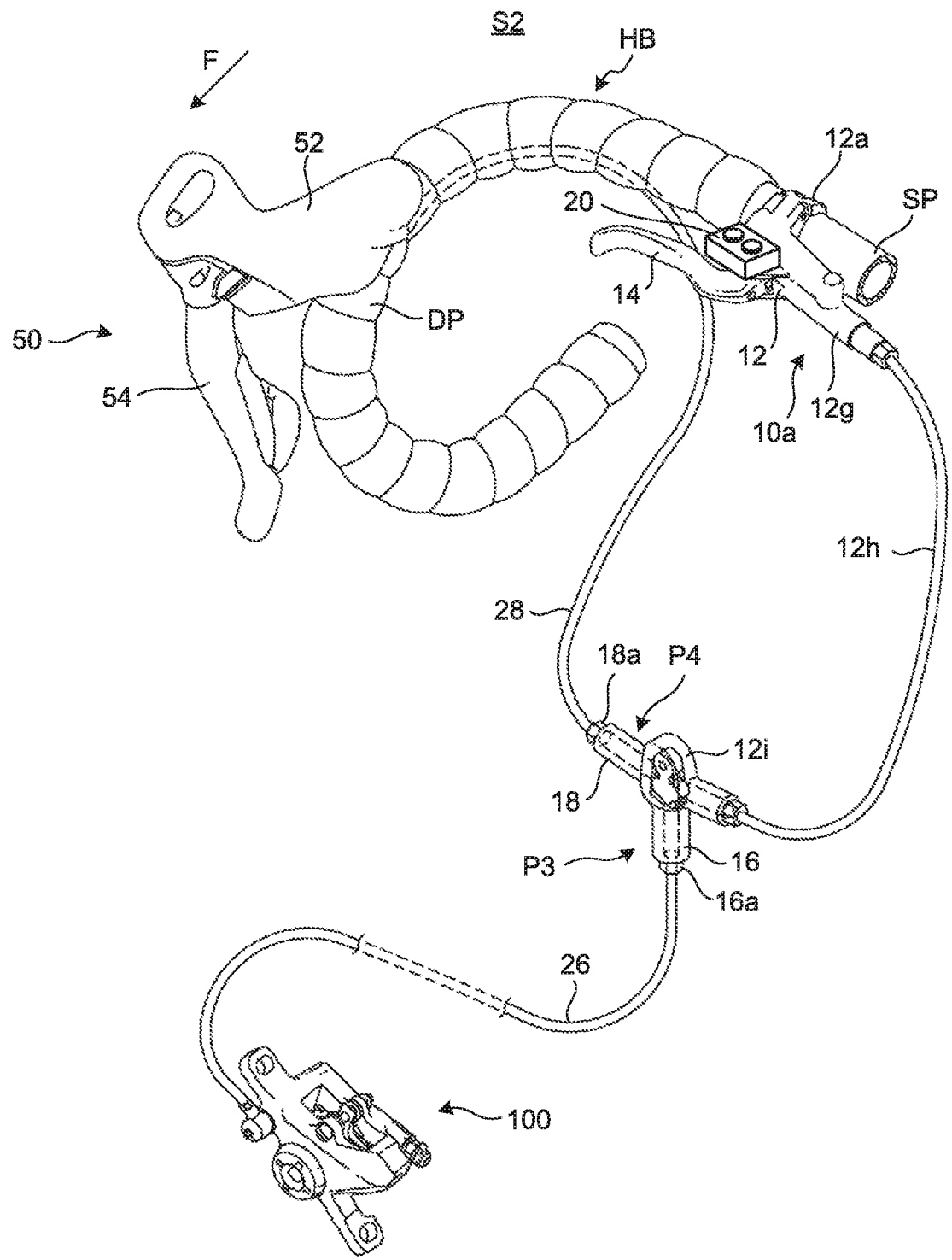
FIG. 5 is a perspective view illustrating an operating system including an operating device according to a first modification.

The other end of the hose 12h is connected to a branching unit 12i. The branching unit 12i is a T-shaped housing in which a transfer channel of the hydraulic fluid 22 is provided. The transfer channel is a transfer channel branched into three. The other end of the hose 12h is connected to one of the three branches of the transfer channel. Another one of the three branches of the transfer channel serves as the first connecting part 16, and the first hose 26 is connected thereto. According to the first modification, a first position P3 is at one of the ends of the T-shaped transfer channel that is provided in the branching unit 12i. The remaining one of the three branches of the transfer channel serves as the second connecting part 18, and the second hose 28 is connected thereto. According to the first modification, a second position P4 is at one of the ends of the T-shaped transfer channel provided to the branching unit 12i, and is different from the first position P3. In FIG. 5, among the three branches, one to which the hose 12h is connected is provided at a position opposite to the one to which the second hose 28 is connected, but the configuration is not limited thereto. The configuration of the three hoses, as to which one of the hose 12h, the first hose 26, and the second hose 28 is to be positioned opposite to which one of the others, can be optionally determined, and can be changed as appropriate.

Second Modification

Figure 6:
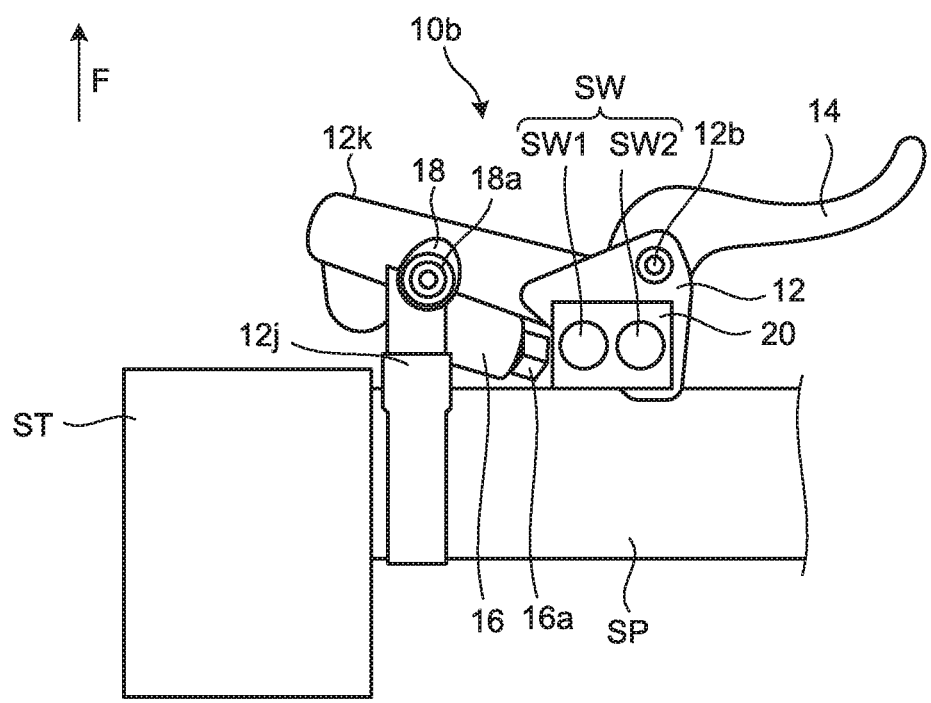
FIG. 6 is a schematic illustrating an operating device according to a second modification.

A specific shape of the master cylinder having the hydraulic fluid 22 as the power transmitting medium is not limited to those of the master cylinder 12e and the master cylinder 12g, and can be changed as appropriate. As illustrated in FIG. 6, the base member 12 can include a master cylinder 12k curving in such a manner that the nut 16a on the first connecting part 16 is positioned on the side opposite to the stem ST. Furthermore, a specific structure for mounting the base member 12 on the handlebar HB is not limited to the clamp 12a illustrated in FIG. 2, and can be changed as appropriate. The base member 12 can be mounted on the handlebar HB using a structure surrounding the handlebar HB at a position adjacent to the stem ST, as a fixing portion 12j illustrated in FIG. 6. In this manner, it is possible to improve the flexibility in the positioning of the additional component 20 disposed on the side opposite to the stem ST, with the fixing portion 12j therebetween. In other words, this configuration allows the additional component 20 to be provided to the base member 12 at a position that is accessible by a user who is holding a grip portion of the handlebar HB. Furthermore, this configuration allows the additional component 20 to be provided at a position accessible by a user who is touching the operating member 14.

Furthermore, as illustrated in FIGS. 5 and 6, the additional component 20 can be fixed directly to the base member 12 without the removable portion 20a interposed therebetween. Furthermore, the additional component 20 can be fixed directly to the operating member 14 without the removable portion 20a interposed therebetween.

The operating systems S1 and S2 operated by the hydraulic pressure of the hydraulic fluid 22 are explained above with reference to FIGS. 1 to 6, but structure of the operating system is not limited to that operated by the hydraulic pressure of the hydraulic fluid 22, and can be changed as appropriate.

Second Embodiment

Figure 7:
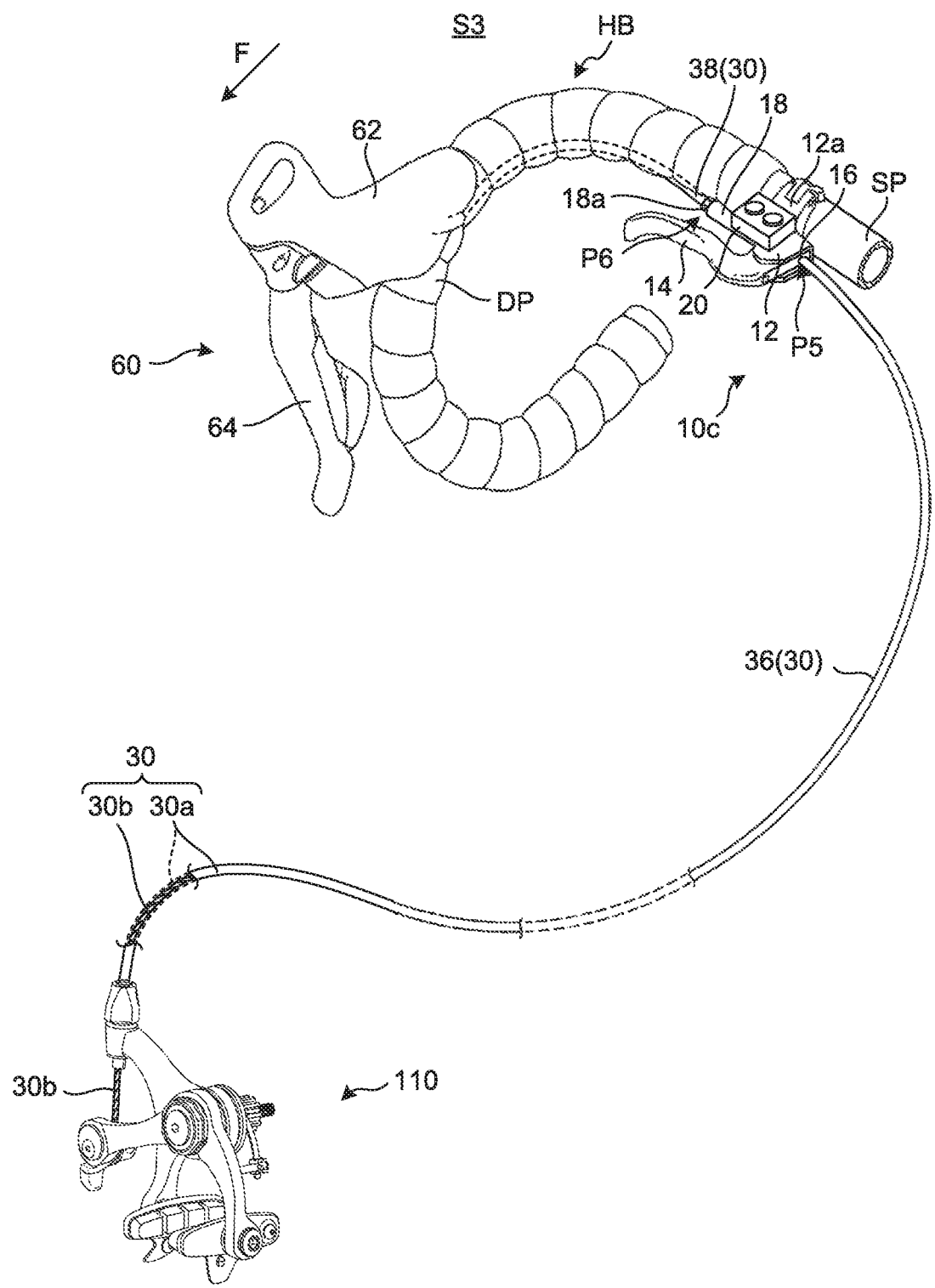
FIG. 7 is a perspective view illustrating an operating system including an operating device according to a second embodiment.

The power transmitting medium used in an operating system S3 illustrated in FIG. 7 is a Bowden cable 30 including an outer casing 30a and an inner wire 30b. The outer casing 30a includes a first outer casing 36 and a second outer casing 38. The first outer casing 36 is connected to the first connecting part 16 provided to the operating member 14, and the second outer casing 38 is connected to the second connecting part 18 provided to the base member 12. Specifically, the operating system S3 includes an operating device 10c, and an operated device 110 that is connected to the operating device 10c via the power transmitting medium.

The operating member 14 illustrated in FIG. 7 is connected to the first outer casing 36. In other words, the operating device 10c according to the second embodiment includes the first connecting part 16 that is provided to the operating member 14, in a manner connectable to the power transmitting medium. A first position P5 where the first connecting part 16 is provided is positioned in the operating member 14. The other end of the first outer casing 36 is fixed to the operated device 110. A second position P6 where the second connecting part 18 illustrated in FIG. 7 is provided is positioned on the side of the drop-down portion DP in the base member 12. In FIG. 7, the second connecting part 18 is positioned on the side of the drop-down portion DP.

To the second connecting part 18 illustrated in FIG. 7, another operating device is connected via the power transmitting medium. A main brake 60 is connected to the second connecting part 18 via the inner wire 30b inside of the second outer casing 38. The second outer casing 38 is fixed to the second connecting part 18 with the nut 18a. The main brake 60 includes a base member 62 that is mounted on the human-powered vehicle 1, and an operating member 64 that is provided to the base member 62. The base member 62 illustrated in FIG. 7 is provided in such a manner that the inner wire 30b can pass therethrough, in the same manner as the base member 12. The base member 62 is fixed to the drop-down portion DP. The operating member 64 is pivotally provided with respect to the base member 62, in the same manner as the relation between the base member 12 and the operating member 14. Furthermore, the operating member 64 is coupled with the inner wire 30b inside the base member 62. The inner wire 30b inside of the second outer casing 38 is pulled by the pivotal movement of the operating member 64. The inner wire 30b in the second outer casing 38 and the inner wire 30b in the first outer casing 36 are connected to each other inside the base member 12. Therefore, when the inner wire 30b in the second outer casing 38 is pulled, the inner wire 30b in the first outer casing 36 is also pulled. In this manner, the operated device 110 is operated.

The pivotal movement of the operating member 14 changes the interval between the first outer casing 36 connected to the operating member 14 and the second outer casing 38 connected to the base member 12. A change in the interval results in a change in the positional relation between the outer casing 30a and the inner wire 30b, and causes the operated device 110 to be operated. To perform a braking operation, a user grips the operating member 14 toward the straight portion SP, to cause the interval between the first outer casing 36 and the second outer casing 38 to widen. As a result of this operation, the length of a channel housing the inner wire 30b in the outer casing 30a is extended, and the end of the inner wire 30b coupled with the operating member 64 is moved away from the operated device 110. In other words, the inner wire 30b is pulled away from the operated device 110.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While certain embodiment and modification of the present invention have been described, the description thereof is not intended to limit the embodiments. The constituting elements described herein include elements easily achieved by one skilled in the art, elements being substantially the same as the constituting elements, and elements within the scope of equivalents of the constituting elements. The constituting elements described herein may be combined in an appropriate manner. Furthermore, various omissions, substitutions and changes in the constituting elements may be made without departing from the spirit of the embodiment.

What is claimed is:

1. An operating device comprising:
   a base member mounted on a human-powered vehicle, the base member having a clamp that is configured to be mounted to a handlebar of the human-powered vehicle;
   an operating member provided to the base member;
   a first connecting part provided to one of the base member and the operating member in a manner connectable to a power transmitting medium;
   a second connecting part provided to the base member in a manner connectable to the power transmitting medium; and
   an additional component provided to at least one of the base member and the operating member independent of the clamp so that the additional component is provided at a location that is offset from the clamp, the additional component is one of a transmission operating device, a driving unit mode selector, a suspension operating device, an adjustable seatpost operating device, and a system information display, the additional component being removably provided to a removable portion that is fixed to at least one of the base member and the operating member.

2. The operating device according to claim 1, wherein the operating member is pivotally provided to the base member.

3. The operating device according to claim 1, wherein the additional component is provided to the base member.

4. The operating device according to claim 1, wherein the base member is configured to be fixed to the handlebar of the human-powered vehicle, and
   the additional component is provided to the base member at a position accessible by a user holding a grip portion of the handlebar.

5. The operating device according to claim 1, wherein the additional component is provided at a position accessible by a user touching the operating member.

6. The operating device according to claim 1, further comprising
   another operating device connected to the second connecting part via the power transmitting medium.

7. The operating device according to claim 1, wherein the base member includes a cylinder bore, and a piston that is provided in the cylinder bore in a manner movable in response to an input to the operating member
   the power transmitting medium is hydraulic fluid, the first connecting part is configured to be connected to a first hose for circulating the hydraulic fluid, and the second connecting part is configured to be connected to a second hose for circulating the hydraulic fluid.

8. The operating device according to claim 1, wherein the power transmitting medium is a Bowden cable including an outer casing and an inner wire, the outer casing includes a first outer casing and a second outer casing, the first connecting part is configured to be connected to the first outer casing, and the second connecting part is configured to be connected to the second outer casing.

9. An operating system comprising the operating device according to claim 1, and further comprising:

an operated device connected to the operating device via the power transmitting medium.

10. The operating device according to claim 1, wherein the removable portion is provided to the base member.

11. An operating device comprising:

a base member mounted on a human-powered vehicle, the base member having a clamp that is configured to be mounted to a handlebar of the human-powered vehicle;

an operating member provided to the base member;

a first connecting part provided to one of the base member and the operating member in a manner connectable to a power transmitting medium;

a second connecting part provided to the base member in a manner connectable to the power transmitting medium; and an additional component provided to at least one of the base member and the operating member at a location that is offset from the clamp, the additional component is one of a transmission operating device, a driving unit mode selector, a suspension operating device, an adjustable seatpost operating device, and a system information display, the additional component being removably provided to at least one of the base member and the operating member, the additional component is removably provided to a removable portion that is provided to the base member, the removable portion being a resin frame body that is fixed to the base member and holds the additional component with the elasticity of the frame body.

12. The operating device according to claim 11, wherein the removable portion is provided to the base member in a manner facing upwards with respect to the ground contact surface of the front wheel.

* * * * *